(12) United States Patent
Clements

(10) Patent No.: US 11,900,910 B2
(45) Date of Patent: Feb. 13, 2024

(54) SYSTEM AND METHOD FOR AUTOMATED AMBIENT NOISE REDUCTION FOR ONLINE MEETINGS

(71) Applicant: Toshiba TEC Kabushiki Kaisha, Shinagawa-ku (JP)

(72) Inventor: Luke Clements, Lake Forest, CA (US)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/692,669

(22) Filed: Mar. 11, 2022

(65) Prior Publication Data
US 2023/0290330 A1    Sep. 14, 2023

(51) Int. Cl.
G10K 11/178    (2006.01)
H04M 3/56    (2006.01)

(52) U.S. Cl.
CPC .... G10K 11/1783 (2018.01); G10K 11/17823 (2018.01); H04M 3/567 (2013.01); H04M 3/568 (2013.01)

(58) Field of Classification Search
CPC ... H04R 1/1083; H04R 3/005; G01L 21/0208; G01L 25/78; G01L 21/02; G01L 2021/02082; G01L 19/012; G01L 25/84; H04M 9/082; H04M 9/08; H04M 3/568; H04M 1/19; H04M 1/6008; H04M 3/567; G10K 11/1783; G10K 11/17823
See application file for complete search history.

(56) References Cited

U.S. PATENT DOCUMENTS

| | | | |
|---|---|---|---|
| 6,290,140 B1* | 9/2001 | Pesko | H04K 3/45 236/47 |
| 11,107,490 B1* | 8/2021 | Slotznick | H04M 3/568 |
| 11,202,148 B1* | 12/2021 | Kamdar | H04L 65/80 |
| 11,521,636 B1* | 12/2022 | Slotznick | G10L 21/0208 |
| 2003/0055324 A1* | 3/2003 | Wasserman | A61B 5/316 600/323 |
| 2006/0145537 A1* | 7/2006 | Escott | B60R 11/02 307/10.1 |
| 2015/0382122 A1* | 12/2015 | El Zur | E05F 15/70 381/73.1 |
| 2019/0361694 A1* | 11/2019 | Gordon | G06F 1/3231 |
| 2020/0186378 A1* | 6/2020 | Six | H04L 41/22 |
| 2020/0234696 A1* | 7/2020 | Vashisht | G10L 15/24 |
| 2021/0374391 A1* | 12/2021 | Jorasch | G06V 40/10 |
| 2022/0141587 A1* | 5/2022 | Chen | G06F 3/165 381/17 |

FOREIGN PATENT DOCUMENTS

CN    114537301 A    *    5/2022
EP    3809410 A1    *    4/2021    ........... G06K 9/0051

* cited by examiner

Primary Examiner — Akelaw Teshale
(74) Attorney, Agent, or Firm — Ulmer & Berne LLP; John X. Garred

(57) ABSTRACT

A system and method for addressing distracting ambient noise during online collaborative meetings monitors when an online meeting is entered by a user at their computer. Smart devices are automatically powered down, paused or otherwise controlled during the online meeting. Devices are returned to their former state once the user leaves the meeting.

20 Claims, 3 Drawing Sheets

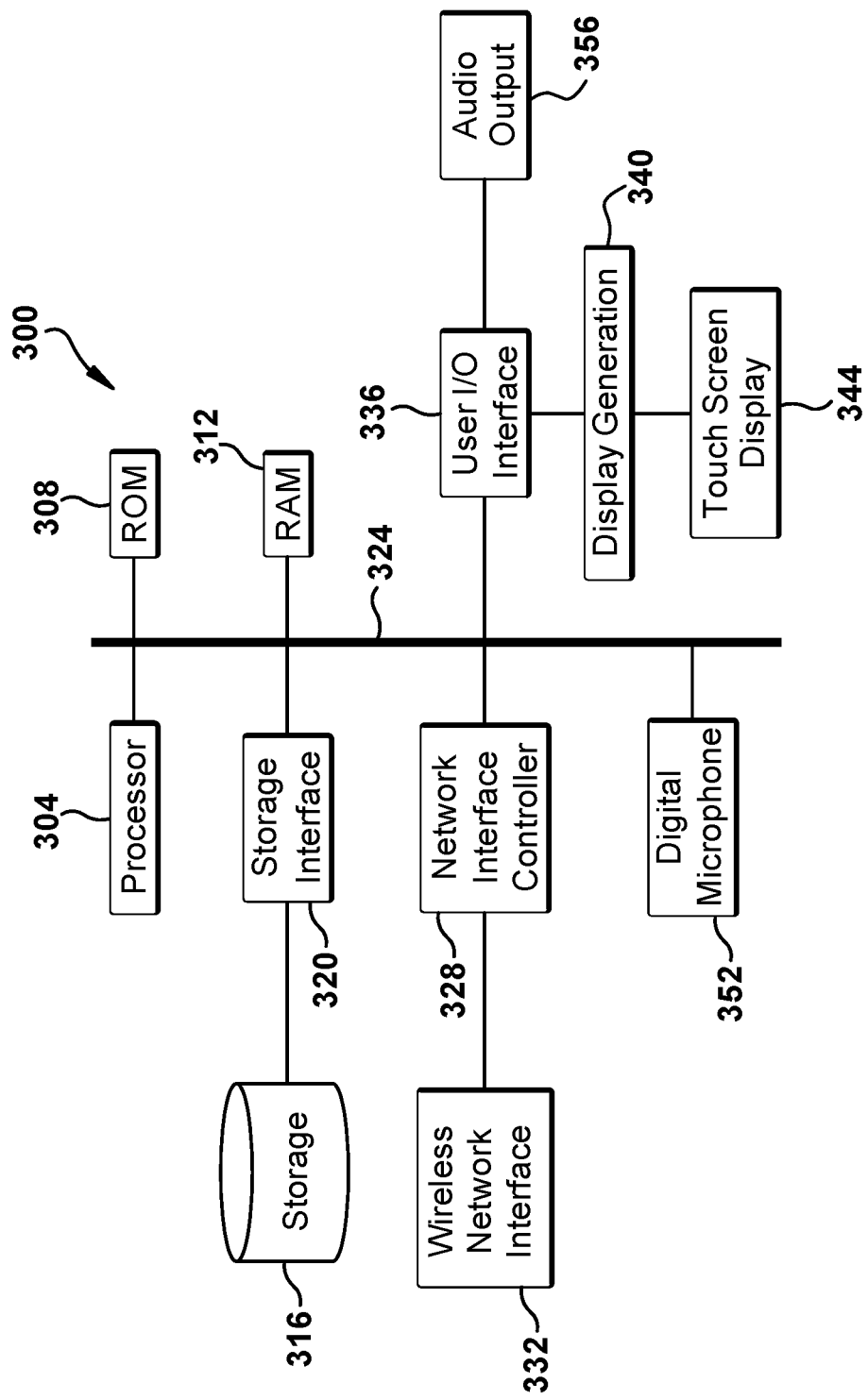

SYSTEM AND METHOD FOR AUTOMATED AMBIENT NOISE REDUCTION FOR ONLINE MEETINGS

TECHNICAL FIELD OF THE INVENTION

This application relates generally to improving the quality of virtual meetings.

BACKGROUND OF THE INVENTION

Online collaboration has become increasingly popular with services such Skype from Skype Technologies, Microsoft Teams, and Zoom from Zoom Video Communications. For business, most collaborative meetings were undertaken from users while at work. The business paradigm shifted strongly to working from home due to the Covid pandemic that started in 2019. Unlike workplace offices, homes include ambient noises that can be disruptive to online meetings.

BRIEF DESCRIPTION OF THE DRAWINGS

Various embodiments will become better understood with regard to the following description, appended claims and accompanying drawings wherein:

FIG. 3 is an example embodiment of a digital device system.

DETAILED DESCRIPTION OF THE INVENTION

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

There is no guarantee that a work from home environment will be like an office environment in terms of the existence of background noise. Online meetings can occur without warning. There may not always be time to turn off loud appliances or address other distracting ambient noises before a meeting starts. Example embodiments here provide a system that includes automatically turning off, muting, or pausing devices when an online collaborative service is launched. By way of example, loud running appliances during meetings can be paused or powered down when an online meeting is commenced and restarted or resumed after the meeting is finished. This results in increased convenience at home and reduced distractions during meetings.

Smart appliances are becoming ubiquitous but lack an integration that allows them to be temporarily turned off or paused during meetings. In example embodiments herein, when a person enters an online meeting at home, a meeting application comprising a collaboration service such Teams, Skype or Zoo sends out a signal to devices, such as appliances, that are listening for a signal directing them to lower or eliminate output noise. These devises are paused until a run signal is resent when the person exits the online meeting.

Figure 1:
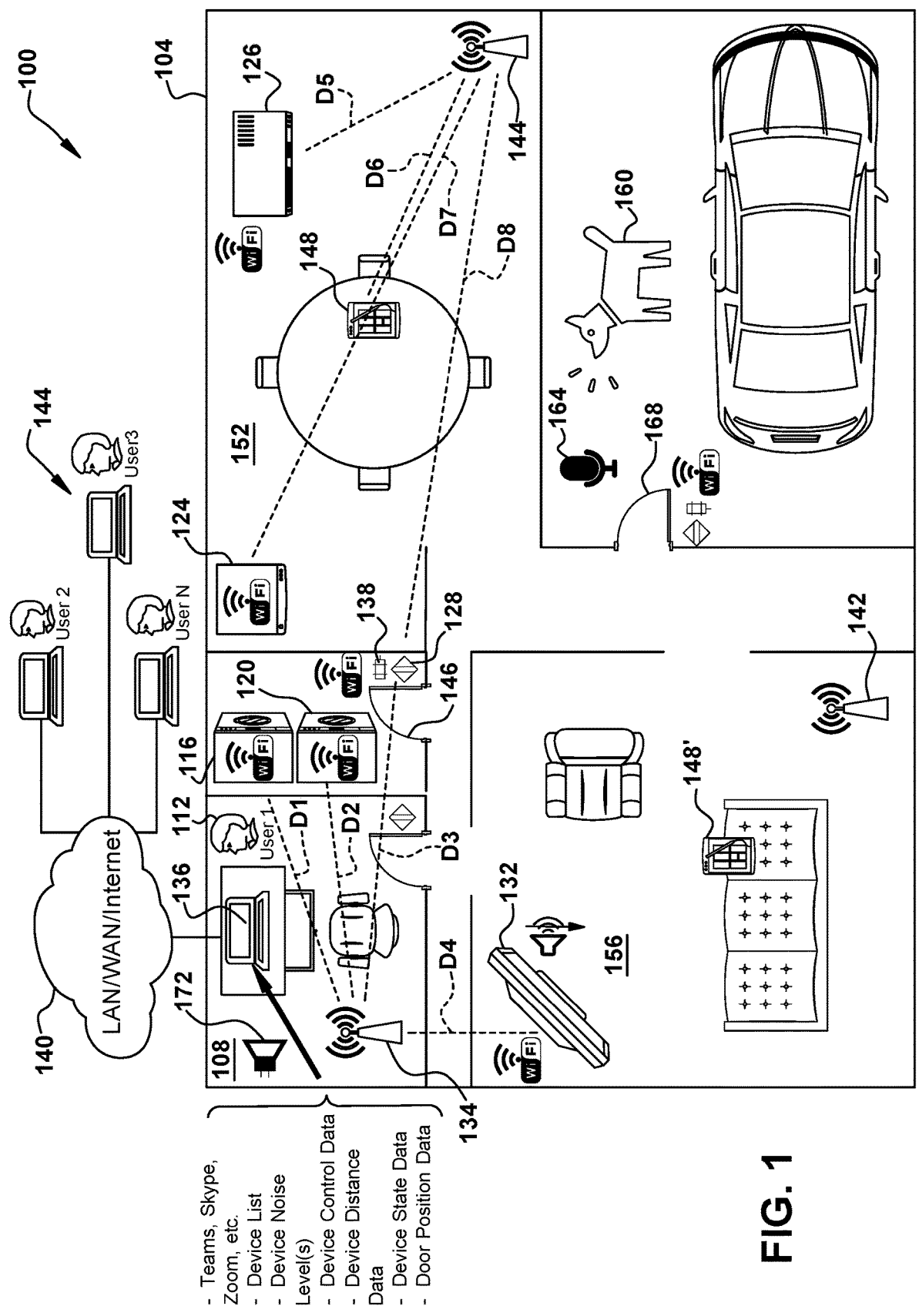
FIG. 1 is an example embodiment of a system for automatic reduction of ambient noises during an online collaborative meeting.

FIG. 1 illustrates an example embodiment of a system 100 for automatic reduction of ambient noises during an online collaborative meeting. System 100 is operable on a premises comprising a home 104 in the illustrated example. Home 104 includes a home office 108 in use by user 112. Noise rendering devices disposed about home 104 include a washer 116, a dryer 120, a dishwasher 124, a sound system 126 and a television 132. Home office 108 includes a computer 136 in use by user 112 which is in data communication with the devices by any suitable wireless or wired means, such as via Wi-Fi hotspot 134. Computer 136 is also in data communication with network cloud 140, suitably comprised of local area network (LAN), a wide area network (WAN) which may comprise the Internet, or any suitable combination thereof. Also in data communication with network cloud 140 are one or more additional users 144 and their associated data devices.

Computer 136 facilitates online collaboration via applications such as Teams, Skype or Zoom, with additional users 144. Computer 136 stores data that may include a device list, noise levels associated with devices, data indicating noise reduction options for devices, device distances, device state information or one or more door positions. Door positions can be determined by sensors, such as sensor 128 associated with door 146. In the illustrated example, the position of door 146 is also remotely controllable via motor 138.

When user 112 enters an online meeting, noise level control instructions are relayed to one or more devices. These may include instructions to turn off or suspend operation, such as with washer 116, dryer 120 and dishwasher 124. Such instructions may also be relayed to sound system 126 or television 132. These devices may also be remotely controllable which may include sound level detection and volume adjustment. With such capabilities, a device may have its volume lowered instead of being turned off. Example instructions to start and end a noise reduction include a power down instruction and a power up instruction, a decrease volume instruction and an increase volume instruction, a pause instruction and a resume instruction, a mute instruction and an unmute instruction, a decrease power instruction and an increase power instruction and a close powered door instruction and an open powered door instruction.

Ambient noise reaching the home office 108 is also affected by a distance between a device and home office 108. Distances may be pre-stored as distance data in computer 136. Alternatively, distances can be determined by geolocation. In a home environment, geolocation is suitably accomplished in connection with wireless data transmission such as free space path loss (FSPL) or a Wi-Fi positioning system (WPS). Information for positioning is suitably acquired by a signal strength of a Wi-Fi link relative to one or more Wi-Fi hotspots having a known location, such as Wi-Fi hotspots 134, 142 and 144. In the illustrated example, acceptable noise emissions for a particular device can vary based on its distance from the online meeting affecting how or how much noise emissions are controlled.

In the illustrated example, determined distance include distances of devices from Wi-Fi hotspot 134, such as distance D1 to washer 116, distance D2 to dryer 120, distance D3 to sensor 128 and distance D4 to television 132. Distances relative to hotspot 144 include distance D5 to sound system 126, distance D6 to tablet computer 148, distance D7 to dishwasher 124 and distance D8 to sensor 128. Distance based noise calculations can be particularly advantageous when a user's computing device is moveable relative to one or more noise rendering devices. By way of particular example, a user may initiate an online collaboration with tablet computer 148 while in kitchen 152, and move to living room 156 where the tablet computer appears as 148'.

In addition to device noises, distracting noises can be associated with living things, such as a barking dog 160. Such noises can arise at any time, before or during a collaboration session. Spontaneous noises are suitably detected by a sonic transducer, such as microphone 164. Spontaneous noises, such as with the barking dog 160 may be addressed by remotely closing powered door 168. Use of data acquired by one or more microphones may also be used to lower ambient sound levels by use of active noise cancellation, such as with cancelling sound waves emanating from speaker 172.

Figure 2:
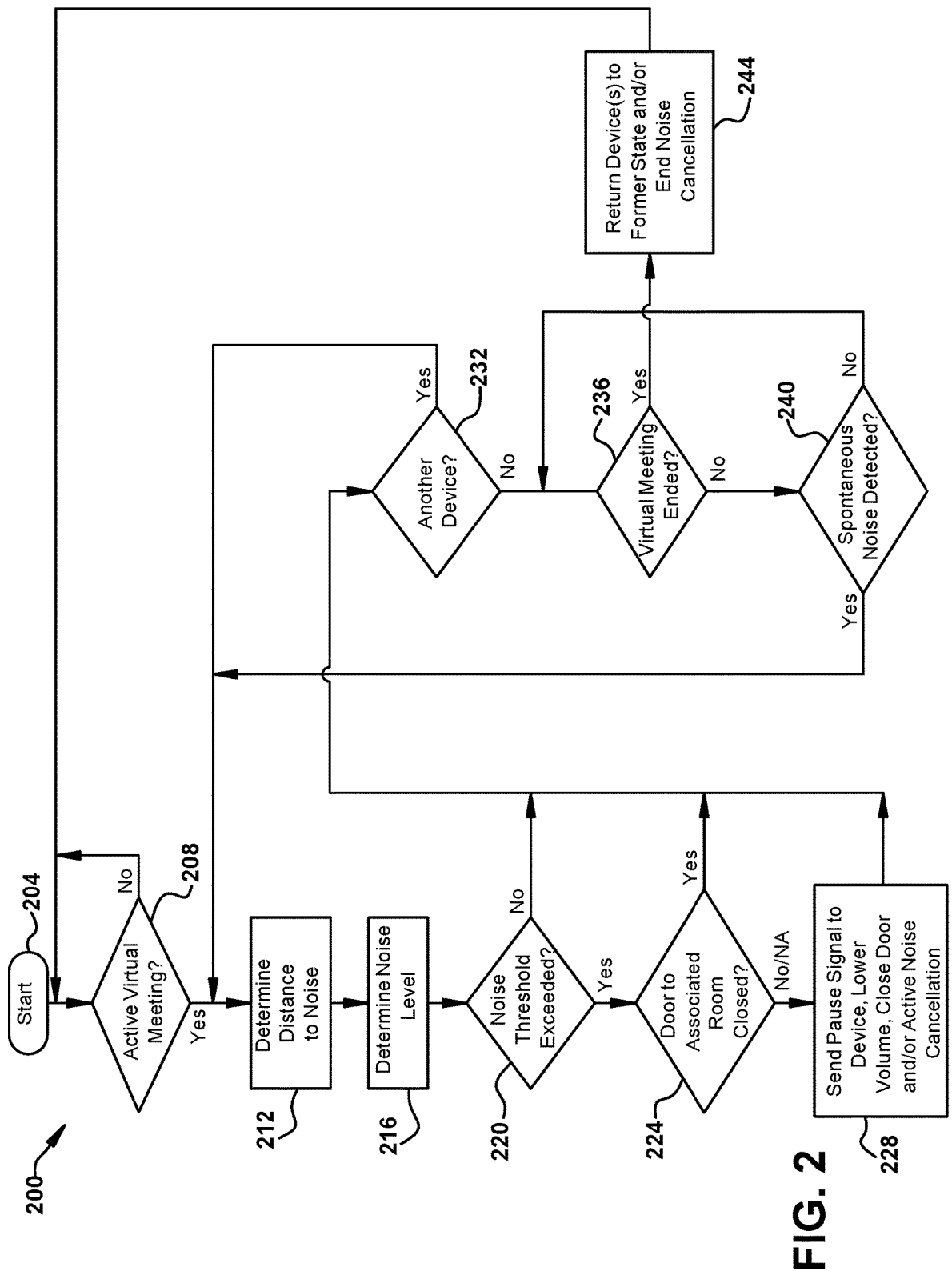
FIG. 2 is a flowchart of an example embodiment of a system for automatic reduction of ambient noises during an online collaborative meeting.

FIG. 2 depicts a flowchart 200 for an example embodiment of a system automatic reduction of ambient noises during an online collaborative meeting. The process commences at block 204 and proceeds to block 208 where it remains until such time an active virtual meeting is detected. At this point, a distance to an active device or noise source is determined at block 212 and a determination of an associated noise level determined at block 216. Such a determination may be made by data associated with a known device noise level for a device, a noise level supplied by a device, such as data indicating a volume setting, or data from captured sounds. A test is made at block 220 to determine whether a noise threshold has been exceed. If so, a determination as to whether an associated door is closed at block 224. If the associated door is opened or if there is no associated, controllable door, the sound level is addressed at block 228 by one or more of pausing a device, which may comprised powering it down or sending a pause command, lowering device volume, closing a powered door or initiating active noise cancellation. Next, a test is made at block 232 to determine whether any additional controllable noise sources are present. If so, the system returns to block 212. If the device was determined to be under a noise threshold at block 220, the system proceeds directly to block 232.

Once it is determined at block 232 that no other devices need be address for noise, the system proceeds to block 236 where a check is made as to whether the virtual meeting is still in progress. If so, the system proceeds to block 240 where a check for new or spontaneous noise emissions are present. If so, the system returns to block 212 to address it. If not, the system loops back to block 236. If the meeting is determined to be over at block 236, the system returns devices to their former state at block 244 and returns to block 208.

Turning now to FIG. 3, illustrated is an example embodiment of a digital data processing device 300 such as computer 136 or tablet computer 148' of FIG. 1. It is to be appreciated that some components listed may be unnecessary in certain configurations. Components of the digital data processing device 300 suitably include one or more processors, illustrated by processor 304, memory, suitably comprised of read-only memory 308 and random access memory 312, and bulk or other non-volatile storage 316, suitably connected via a storage interface 320. Data communication among components is accomplished via data bus 324. A network interface controller 328 suitably provides a gateway for data communication with other devices, via any wireless or wired connection, such as via wireless network interface 332. A user input/output interface 336 is suitably comprised of display generator 340 interfacing with touchscreen display 344. As noted above, any suitable user input and display can be used. Processor 304 processor is also in data communication with a digital microphone 352 and audio output 356 via interface 336.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system comprising:
a processor and associated memory;
a data interface;
a user interface including a user input and a display;
a plurality of noise rendering devices disposed about a premises in data communication with the processor via the data interface;
the associated memory storing device control data corresponding to remote control of a noise output level of each of the plurality of noise rendering devices;
the processor configured to detect a launch of a user application collaboration session; and
the processor further configured to initiate a lowering of the noise output level for each of the plurality of noise rendering devices via the data interface in accordance with device control data responsive to a detected launch and location of the user application collaboration session.

2. The system of claim 1 further comprising:
the processor further configured to detect a termination of the user application collaboration session; and
the processor further configured to initiate a raising of the noise output level for each of the plurality of noise rendering devices via the data interface in accordance with the device control data responsive to a detected termination of the user application collaboration session.

3. The system of claim 2 wherein the device control data comprises one or more of a power down instruction, a decrease volume instruction, a pause instruction, a mute instruction, a decrease power instruction and a close power door instruction.

4. The system of claim 3 wherein one or more of the instructions are based on a distance from an associated noise rendering device.

5. The system of claim 4 wherein the data interface is composed of a wireless data interface and wherein the processor is further configured to determine distances in accordance with signal strength of signals broadcast from the associated noise rendering device.

6. The system of claim 5 wherein the processor is further configured to determine the distances in accordance with Wi-Fi positioning.

7. The system of claim 3 further comprising a door sensor configured to determine a position of an associated door, and wherein one or more of the instructions are based in accordance with a determined door position.

8. The system of claim 7 wherein the associated door is motorized and wherein the processor is further configured close the associated door in accordance with the device control data.

9. A method comprising:
- detecting a launch of a user application collaboration session;
- sending a first instruction that lowers noise output level for each of a plurality of noise rendering devices in accordance with a detected launch and location of the user application collaboration session;
- detecting termination of the user application collaboration session; and
- sending a second instruction that raises the noise output level for each of the plurality of noise rendering devices.

10. The method of claim 9 wherein the first instruction and the second instruction are comprised of one or more instruction pairs comprising:
- a power down instruction and a power up instruction,
- a decrease volume instruction and an increase volume instruction,
- a pause instruction and a resume instruction,
- a mute instruction and an unmute instruction,
- a decrease power instruction and an increase power instruction, and
- a close powered door instruction and an open powered door instruction.

11. The method of claim 10 wherein one or more of the instructions are based on a distance from an associated noise rendering device.

12. The method of claim 11 further comprising determining distances in accordance with signal strength of signals broadcast from the associated noise rendering device.

13. The method of claim 12 further comprising determining the distances in accordance with Wi-Fi positioning.

14. The method of claim 10 further comprising determining a position of an associated door, wherein one or more of the instructions are based in accordance with a determined door position.

15. The method of claim 14 wherein the associated door is motorized further comprising closing the associated door in accordance with the close powered door instruction.

16. A system comprising:
- a plurality of smart appliances configured for data communication with a digital data device;
- the digital data device configured to run a user application collaboration session for audio/video collaboration via a network;
- the digital data device further configured to determine a launch and location of the user application collaboration session;
- the digital data device configured to determine which of the plurality of smart appliances are activated and producing noise relative to the location; and
- the digital data device further configured to send an instruction to each of the plurality of smart appliances to lower an associated noise level.

17. The system of claim 16 wherein the digital data device is further configured to determine a termination of the user collaboration application session and send a resume instruction to each of the plurality of smart appliances to resume a previous associated noise level.

18. The system of claim 17 wherein the plurality of smart appliances comprise two or more of a washing machine, a dryer, a television, a sound system and a dishwasher.

19. The system of claim 18 wherein the data communication between the plurality of smart appliances and the digital data device is via Wi-Fi.

20. The system of claim 18 wherein the instructions sent to each of the plurality of smart appliances correspond to a distance to the digital data device.

* * * * *